US 9,751,564 B2

(12) United States Patent
Muehlhausen et al.

(10) Patent No.: US 9,751,564 B2
(45) Date of Patent: Sep. 5, 2017

(54) SPRING SUPPORT FOR A MOTOR VEHICLE

(71) Applicant: Bayerische Motoren Werke Aktiengesellschaft, Munich (DE)

(72) Inventors: Mark Muehlhausen, Woerth (DE); Thomas Ritschel, Munich (DE); Sebastian Goldschmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 111 days.

(21) Appl. No.: 14/940,312

(22) Filed: Nov. 13, 2015

(65) Prior Publication Data
US 2016/0068190 A1 Mar. 10, 2016

Related U.S. Application Data

(63) Continuation of application No. PCT/EP2014/058510, filed on Apr. 25, 2014.

(30) Foreign Application Priority Data

May 16, 2013 (DE) ........................ 10 2013 209 099

(51) Int. Cl.
B62D 21/11 (2006.01)
B62D 25/08 (2006.01)
(Continued)

(52) U.S. Cl.
CPC ............ *B62D 21/11* (2013.01); *B62D 25/088* (2013.01); *B62D 27/026* (2013.01);
(Continued)

(58) Field of Classification Search
CPC .... B62D 21/11; B62D 25/088; B62D 27/026; B62D 29/005; B62D 65/12; B62D 65/16;
(Continued)

(56) References Cited

U.S. PATENT DOCUMENTS 4,669,777 A * 6/1987 Harasaki .............. B62D 25/082
296/203.02
5,024,482 A * 6/1991 Isukimi .................... B60G 7/00
280/124.125
(Continued)

FOREIGN PATENT DOCUMENTS

CN 101037118 A 9/2007
CN 102803049 A 11/2012
(Continued)

OTHER PUBLICATIONS

International Search Report (PCT/ISA/210) issued in International counterpart application No. PCT/EP2014/058510 dated Jul. 8, 2014, with English translation (Five (5) pages).
(Continued)

Primary Examiner — Barry Gooden, Jr.
(74) Attorney, Agent, or Firm — Crowell & Moring LLP

(57) ABSTRACT

A spring support for a motor vehicle has a spring strut cup made of a metallic material and three shell-shaped components made of a fiber composite material. The parts are specifically arranged to stabilize the spring support which protects against corrosion and for saving weight such that the spring strut cup is connected in the shell shaped components in the following manner: a first shell-shaped component stretches in an arc from an outer side of an engine bracket to a lower side of a support bracket and the spring strut cup is secured by the edge thereof from under the first shell-shaped component, a second shell-shaped component joins together an upper side of the support bracket, an upper side of the first shell-shaped component and an outer upper side of the spring strut cup, and a third shell shaped component is secured to an inner side of the engine support bracket, an upper side of the engine support bracket, an inner
(Continued)

side of the first shell-shaped component and an inner upper side of the spring strut cup.

19 Claims, 3 Drawing Sheets

(51) Int. Cl.
    *B62D 27/02*      (2006.01)
    *B62D 29/00*      (2006.01)
    *B62D 65/12*      (2006.01)
    *B60G 15/06*      (2006.01)
    *B60G 13/00*      (2006.01)

(52) U.S. Cl.
    CPC ........... *B62D 29/005* (2013.01); *B62D 65/12* (2013.01); *B60G 13/003* (2013.01); *B60G 15/068* (2013.01)

(58) Field of Classification Search
    CPC .. B60G 13/001; B60G 13/003; B60G 15/067; B60G 15/068; B60G 2204/4602
    See application file for complete search history.

(56) References Cited

U.S. PATENT DOCUMENTS

| | | | | |
|---|---|---|---|---|
| 5,350,214 A * | 9/1994 | Yamauchi | ............ | B62D 25/088 296/198 |
| 5,375,870 A * | 12/1994 | Smith | ............ | B60G 11/16 180/297 |
| 6,135,498 A | 10/2000 | Vlahovic | | |
| 6,540,284 B2 * | 4/2003 | Miyata | ............ | B62D 25/088 180/68.4 |
| 7,789,429 B2 * | 9/2010 | Hampe | ............ | B60G 15/067 280/124.147 |
| 9,616,937 B2 * | 4/2017 | Sasaki | ............ | B62D 25/088 |
| 2002/0040819 A1 * | 4/2002 | Miyata | ............ | B62D 25/084 180/68.5 |
| 2006/0006699 A1 | 1/2006 | Matsuyama et al. | | |
| 2008/0150271 A1 * | 6/2008 | Kosaka | ............ | B62D 21/152 280/788 |
| 2009/0146455 A1 * | 6/2009 | Honji | ............ | B62D 21/152 296/187.09 |
| 2012/0138757 A1 * | 6/2012 | Hong | ............ | B62D 25/088 248/205.1 |
| 2013/0076069 A1 | 3/2013 | Fuchs et al. | | |
| 2014/0049019 A1 * | 2/2014 | Ahn | ............ | B62D 21/09 280/124.155 |
| 2014/0049074 A1 * | 2/2014 | Lee | ............ | B62D 25/088 296/203.02 |
| 2015/0251703 A1 * | 9/2015 | Yamada | ............ | B62D 25/087 296/187.12 |
| 2015/0290989 A1 * | 10/2015 | Kim | ............ | B62D 25/088 280/124.1 |
| 2015/0314811 A1 * | 11/2015 | Shibata | ............ | B62D 25/082 296/193.09 |
| 2016/0129747 A1 * | 5/2016 | Mildner | ............ | B62D 25/088 280/124.155 |
| 2016/0159399 A1 * | 6/2016 | Yasuhara | ............ | B62D 25/082 180/292 |
| 2016/0264176 A1 * | 9/2016 | Balzer | ............ | B62D 21/11 |
| 2017/0008570 A1 * | 1/2017 | Mildner | ............ | B62D 25/088 |
| 2017/0043810 A1 * | 2/2017 | Kim | ............ | B62D 21/09 |

FOREIGN PATENT DOCUMENTS

| | | |
|---|---|---|
| DE | 196 30 647 A1 | 2/1998 |
| DE | 10 2010 030 295 A1 | 12/2011 |
| EP | 1 834 862 A1 | 9/2007 |
| JP | 1-269678 A | 10/1989 |
| JP | 6-144291 A | 5/1994 |
| JP | 2010-247599 A | 11/2010 |

OTHER PUBLICATIONS

German Search Report issued in counterpart German application No. 10 2013 209 099.4 dated Jan. 17, 2014, with English translation (Ten (10) pages).

Chinese Office Action issued in counterpart Chinese Application No. 201430026374.9 dated Sep. 5, 2016 with English translation (eight pages).

* cited by examiner

SPRING SUPPORT FOR A MOTOR VEHICLE

CROSS REFERENCE TO RELATED APPLICATIONS

This application is a continuation of PCT International Application No. PCT/EP2014/058510, filed Apr. 25, 2014, which claims priority under 35 U.S.C. §119 from German Patent Application No. 10 2013 209 099.4, filed May 16, 2013, the entire disclosures of which are herein expressly incorporated by reference.

BACKGROUND AND SUMMARY OF THE INVENTION

The invention relates to a spring support for a motor vehicle, to the use of the spring support and to the production of a spring support for a motor vehicle.

In order to connect a spring-damping unit of a front axle, bodywork structures are known in which a spring support is produced from a plurality of steel plates, and a spring strut cup composed of steel is welded to a plurality of shell components composed of steel, which have connections to an engine bracket and to a supporting bracket. Due to the high dead weight of the steel, bodywork structures composed of lighter materials have more recently been provided. For example, spring supports which are produced from light metal in a die cast structure are known. However, the light metals used here lead in combination with a bodywork structure composed of even lighter carbon fiber composite plastic (CFP) to contact corrosion and problems due to the different coefficients of thermal expansion of the light metals in comparison to CFP and steel.

On the basis of this prior art, it is therefore the object of the present invention to provide a spring support for a motor vehicle, which spring support, firstly, satisfies the high mechanical requirements of a spring support, and secondly, avoids contact corrosion and problems due to different coefficients of thermal expansion, but nevertheless has only a low weight. Furthermore, it is the object of the invention to provide a simple and cost-effective method for producing a spring support which is stable, is nevertheless very light, is protected against corrosion and is protected from problems based on different coefficients of thermal expansion.

This and other objects are achieved according to the invention in the case of a spring support for a motor vehicle in that a spring strut cup composed of a metallic material, and three shell components composed of a fiber composite material, in particular a fiber-reinforced plastic, are provided, wherein the spring strut cup is connected in the shell components in such a manner that: (i) a first shell component spans an arc from an outer side of an engine bracket to a lower side of a support bracket, and the spring strut cup is fastened at the edge thereof from below to the first shell component, (ii) a second shell component connects an upper side of the supporting bracket, an upper side of the first shell component and an outer upper side of the spring strut cup to one another, and (iii) a third shell component is fastened to an inner side of the engine bracket and to an upper side of an engine bracket and to an inner side of the first shell component and an inner upper side of the spring strut cup.

By forming the spring strut cup from a metallic material, the latter can be stably screwed to a supporting bearing of a spring suspension, for example a front axle spring suspension. Owing to the fact that the spring strut cup is connected in a specific manner to three shell components composed of a fiber composite material, and the fiber composite materials provide a secure bond with the surrounding motor vehicle parts, for example an engine bracket and a supporting bracket, which are likewise preferably formed in a fiber composite construction (for example CFP), contact corrosion and problems due to different coefficients of thermal expansion can be effectively averted. In addition, weight is effectively reduced by using shell components in a fiber composite construction, with consistently good mechanical properties. By means of the specific arrangement and geometry of the individual components, the spring strut cup is embedded twice in the pressure direction in the surrounding shell components, and therefore the connection thereof is predominantly subject to compression loading. The composite construction according to the invention composed of metallic material and fiber composite materials is therefore distinguished by excellent stability with a high weight saving.

According to an advantageous development, the fiber composite material forming the shell components is a carbon fiber composite material, in particular a carbon fiber reinforced plastic (CFRP). Carbon fiber composite materials are distinguished by a very low dead weight with very good mechanical properties.

For a permanent connection of the shell components and the spring strut cup, it is furthermore advantageous that the spring strut cup and the shell components are connected to one another by use of adhesive bonding. This is furthermore beneficial for stability against corrosion. By means of the preferably sheet like adhesive bond along the respective connecting surfaces, a connection is provided which is sufficiently stable to pressure and withstands even high mechanical loads of that type that act on a front axle of a motor vehicle.

In a further advantageous development, the spring strut cup, the first shell component and the second shell component are connected to one another in such a manner that a substantially rectangular profile is formed between an outer side of the spring strut cup, an inner side of the supporting bracket, the first shell component which is joined from below to the supporting bracket and the second shell component which is connected to the upper side of the supporting bracket. This is of advantage for a uniform transmission of force, and therefore the spring support according to the invention is resistant even to high mechanical actions.

In order to further increase the stability of the spring support according to the invention, the first shell component and the third shell component together form a substantially vertical profile which is closed at the upper end thereof by the spring strut cup and at the lower end thereof by the engine bracket.

The use of the above-described spring support for a motor vehicle for the connection of a spring-damper unit of a front axle, preferably a McPherson front axle, is likewise described according to the invention. Owing to the specific geometry of a McPherson front axle, the spring support according to the invention is particularly readily suitable for this purpose.

Furthermore, a method for producing a spring support for a motor vehicle is described according to the invention, which method is characterized by the following acts: (i) providing a spring strut cup composed of a metallic material, and three shell components composed of a fiber composite material, in particular a fiber-reinforced plastic, (ii) fastening a first shell component to an outer side of an engine bracket and to a lower side of a supporting bracket such that the first shell component spans an arc, (iii) fastening an edge of the spring strut cup from below to the first shell component, (iv)

connecting a second shell component to an upper side of a supporting bracket, an upper side of the first shell component and an outer upper side of the spring strut cup, and (v) fastening a third shell component to an inner side of an engine bracket and an upper side of an engine bracket and to an inner side of the first shell component and an inner upper side of the spring strut cup.

By use of the method according to the invention, in particular by use of a combination of specific materials for a spring strut cup and shell components for fastening to correspondingly provided motor vehicle parts with a specific geometry, arrangement and manner of fastening the shell components, an advantageous spring support is provided for a motor vehicle in a simple and cost-effective manner without a high technical outlay. The spring support is corrosion-resistant, is protected from problems with different coefficients of thermal expansion and is stable and is likewise distinguished by a significantly weight-reduced construction.

The advantageous effects, advantages and refinements described for the spring support according to the invention for a motor vehicle are also applied to the method according to the invention for producing a spring support for a motor vehicle. It should furthermore be mentioned that the method according to the invention is also suitable for producing the above-described spring support.

In order to ensure a permanent bond between the provided components of the spring support and in order, furthermore, to avoid contact corrosion, the spring strut cup and the shell components are adhesively bonded to one another.

In order to provide a uniform transmission of force during operation of the spring support such that the spring support is resistant even to high mechanical effects, the method according to the invention is furthermore characterized in that the spring strut cup is joined to the first shell component, which is joined from below to the lower side of the supporting bracket, and the second shell component is joined from above to the upper side of the supporting bracket and to the spring strut cup. Therefore, a substantially rectangular profile is formed between an outer side of the spring strut cup, an inner side of the supporting bracket, the first shell component, which is joined from below to the supporting bracket, and the second shell component, which is connected to the upper side of the supporting bracket.

By way of the further advantageous refinement that the third shell component together with the first shell component forms a substantially vertical profile which is closed at the lower end thereof by the engine bracket and at the upper end thereof by the spring strut cup, the stability of the spring support can be further increased.

As a result of the refinements and developments of the spring support according to the invention for a motor vehicle and of the method according to the invention for producing a spring support for a motor vehicle, in particular the following advantages are afforded:

(1) the mechanical properties of the spring support are improved by the selection according to the invention of the materials in combination with the designated geometry and arrangement of the components, (2) the bond between the shell components and the spring strut cup is stabilized, (3) the weight of the spring support according to the invention is lower, with the same functional properties, than in the case of spring supports produced in a conventional construction, (4) the spring support is effectively protected against contact corrosion, (5) problems due to different coefficients of thermal expansion are avoided, (6) the method can be realized in a simple manner without a high technical outlay and therefore cost-effectively.

Other objects, advantages and novel features of the present invention will become apparent from the following detailed description of one or more preferred embodiments when considered in conjunction with the accompanying drawings.

DETAILED DESCRIPTION OF THE DRAWINGS

Only those parts of the assembly that are of interest here for a vehicle bodywork are illustrated in the figures; all other elements are omitted for the sake of clarity. Furthermore, identical reference numbers represent identical components.

In the figures, the assembly according to the invention is explained using the example of a spring support for a front axle of a motor vehicle. However, the spring support according to the invention can also be used in some other way in a motor vehicle.

Figure 1:
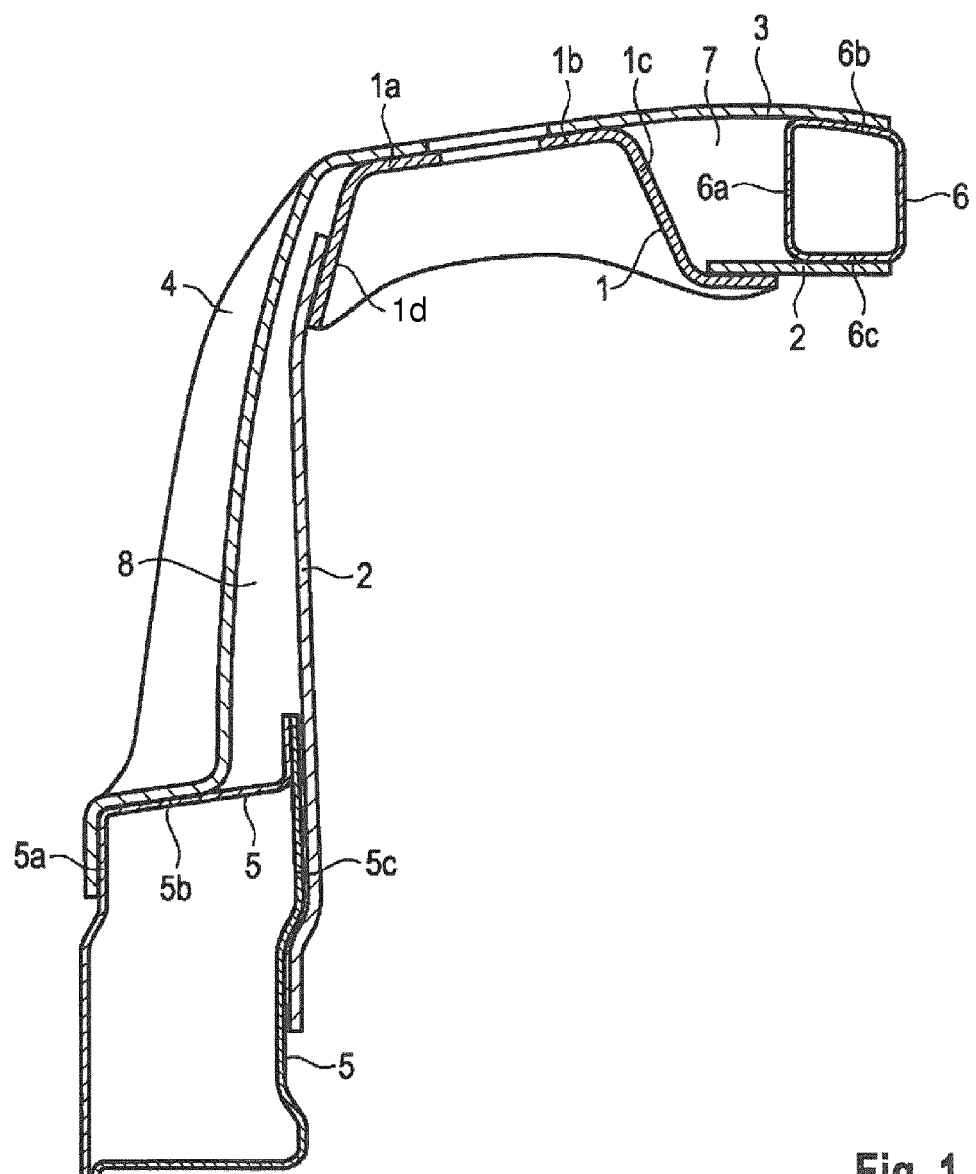
FIG. 1 is a cross section view through a spring support according to a first embodiment of the invention.
Figure 2:
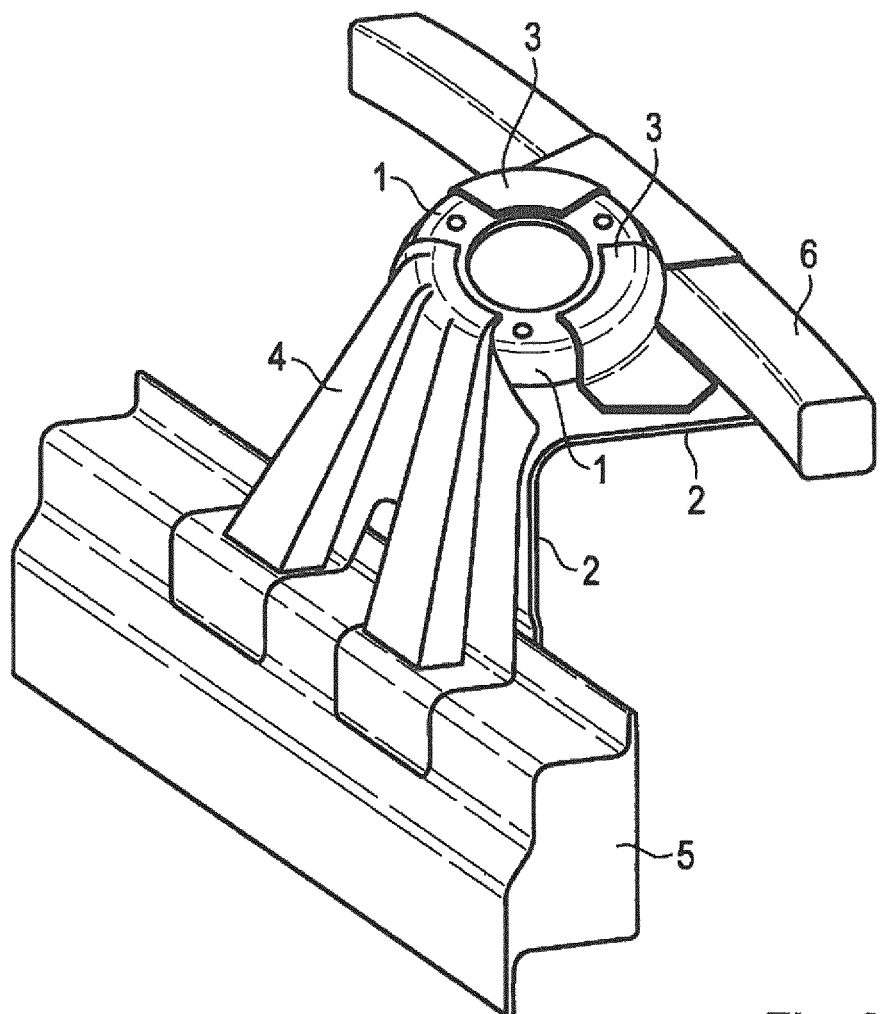
FIG. 2 is a perspective view of the spring support according to the first embodiment of the invention from FIG. 1 obliquely from the front.
Figure 3:
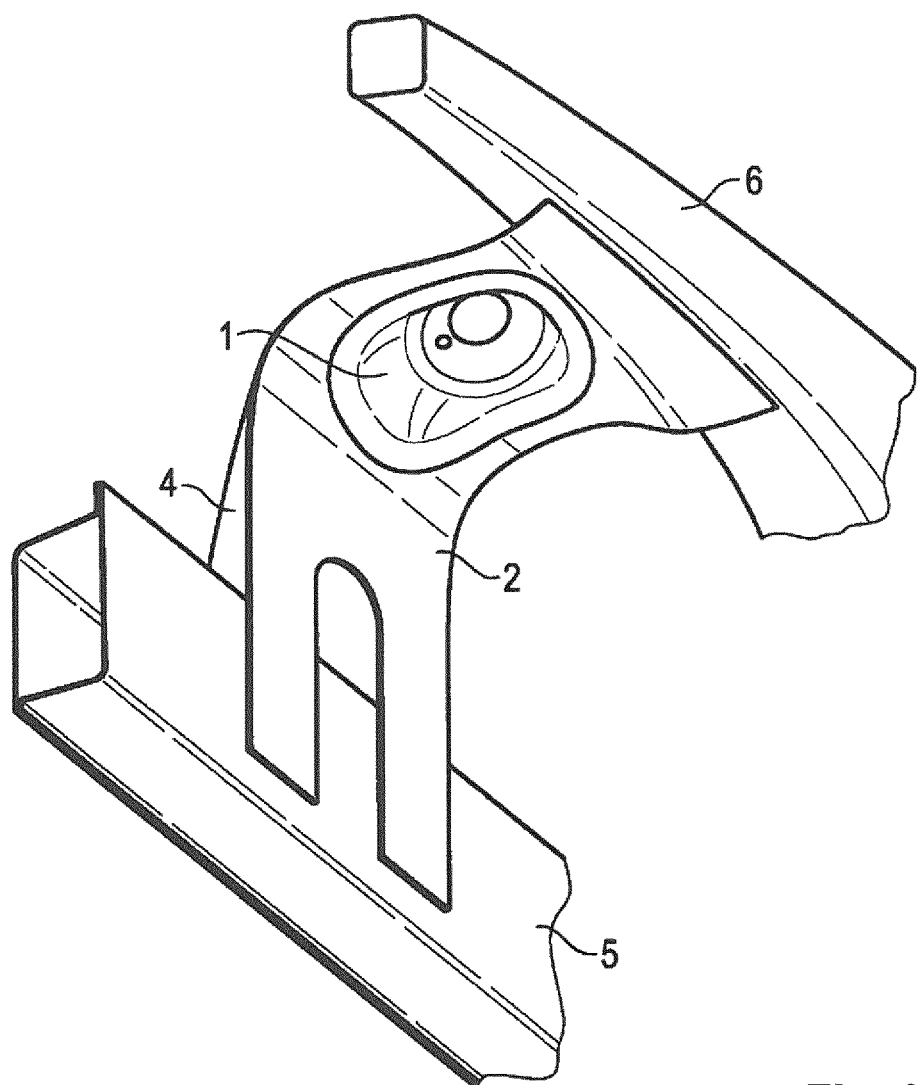
FIG. 3 is a perspective view of the spring support according to the first embodiment of the invention from FIG. 1 obliquely from below.

FIG. 1 shows a cross section through a spring support according to a first embodiment of the invention. FIGS. 2 and 3 show perspective views of the spring support from FIG. 1 from obliquely at the front and from obliquely below, respectively. A spring strut cup 1, a supporting bracket 6, a first shell component 2, a second shell component 3, a third shell component 4 and an engine bracket 5 are shown.

The spring strut cup 1 is formed from a metallic material, for example from steel or aluminum. The three shell components 2, 3, 4 are composed of a fiber composite material, preferably a carbon fiber composite material.

As shown in detail in FIG. 1, the spring strut cup 1 is connected to the shell components 2, 3, 4 in such a manner that the first shell component 2 spans an arc from the outer side of an engine bracket 5c to the lower side of a supporting bracket 6c. The spring strut cup 1 is fastened at the edge 1d thereof from below to the first shell component 2. The second shell component 3 connects the upper side of the supporting bracket 6b, the upper side of the first shell component 2 and the outer upper side 1b of the spring strut cup 1 to one another. The third shell component 4 is fastened to the inner side of the engine bracket 5a and the upper side of an engine bracket 5b and to the inner side of the first shell component 2 and the inner upper side 1a of the spring strut cup 1.

By means of the specific selection of materials and geometrical shapes of the individual components forming the spring support, and also the arrangement of the individual components, a spring support having very good mechanical properties, high corrosion stability and a low weight is provided.

By connecting the spring strut cup 1 and the shell components 2, 3, 4 by way of adhesive bonding, the stability of the spring support and the corrosion stability thereof can be optimized.

FIG. 1 furthermore shows that the spring strut cup 1, the first shell component 2 and the second shell component 3 are connected to one another in such a manner that a substantially rectangular profile 7 is formed between the outer side 1c of the spring strut cup 1, the inner side 6a of the supporting bracket 6, the first shell component 2, which is joined from below to the supporting bracket 6, and the second shell component 3, which is connected to the upper side 6b of the supporting bracket. This assists a uniform transmission of force to the spring support, and therefore the latter is resistant even to high mechanical effects.

Furthermore, the first shell component 2 and the third shell component 4 together form a substantially vertical profile 8 which is closed at the upper end thereof by the spring strut cup 1 and at the lower end thereof by the engine bracket 5. This likewise contributes to increasing the stability of the spring support.

The above description of the present invention serves only for illustrative purposes and not for the purpose of restricting the invention. Various changes and modifications are possible within the context of the invention without departing from the scope of the invention and the equivalents thereof.

LIST OF REFERENCE NUMBERS

1 Spring strut cup
1a Outer upper side of the spring strut cup
1b Inner upper side of the spring strut cup
1c Inner side of the spring strut cup
1d Edge of the spring strut cup
2 First shell component
3 Second shell component
4 Third shell component
5 Engine bracket
5a Inner side of the engine bracket
5b Upper side of the engine bracket
5c Outer side of the engine bracket
6 Supporting bracket
6a Inner side of the supporting bracket
6b Upper side of the supporting bracket
6c Lower side of the supporting bracket
7 Rectangular profile
8 Vertical profile The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A spring support for a motor vehicle, comprising:
a spring strut cup composed of a metallic material;
three shell components composed of a fiber composite material, wherein
the spring strut cup is connected in the three shell components such that:
(i) a first of the three shell components spans an arc from an outer side of an engine bracket to a lower side of a support bracket, the spring strut cup being fastened at an edge thereof from below to the first shell component,
(ii) a second of the three shell components connects an upper side of the support bracket, an upper side of the first shell component and an outer upper side of the spring strut cup to one another, and
(iii) a third of the three shell components is fastened to an inner side of the engine bracket, an upper side of the engine bracket, an inner side of the first shell component and an inner upper side of the spring strut cup.

2. The spring support according to claim 1, further comprising adhesive bonds used to connect the spring strut cup to the shell components.

3. The spring support according to claim 1, wherein the first shell component and the third shell component together form a substantially vertical profile which is closed at an upper end thereof by the spring strut cup and at a lower end thereof by the engine bracket.

4. The spring support according to claim 1, wherein
the spring strut cup, the first shell component and the second shell component are connected to one another such that a substantially rectangular profile is formed between an outer side of the spring strut cup, an inner side of the support bracket, the first shell component which is joined from below to the support bracket and the second shell component which is joined to an upper side of the support bracket.

5. The spring support according to claim 4, wherein the first shell component and the third shell component together form a substantially vertical profile which is closed at an upper end thereof by the spring strut cup and at a lower end thereof by the engine bracket.

6. The spring support according to claim 1, wherein the spring support is configured for connection with a spring damper unit of a front axle of the motor vehicle.

7. The spring support according to claim 6, wherein the front axle of the motor vehicle is a McPherson front axle.

8. The spring support according to claim 1, wherein the fiber composite material is a carbon fiber composite material.

9. The spring support according to claim 2, further comprising adhesive bonds used to connect the spring strut cup to the shell components.

10. The spring support according to claim 9, wherein
the spring strut cup, the first shell component and the second shell component are connected to one another such that a substantially rectangular profile is formed between an outer side of the spring strut cup, an inner side of the support bracket, the first shell component which is joined from below to the support bracket and the second shell component which is joined to an upper side of the support bracket.

11. The spring support according to claim 6, wherein the first shell component and the third shell component together form a substantially vertical profile which is closed at an upper end thereof by the spring strut cup and at a lower end thereof by the engine bracket.

12. A method for producing a spring support for a motor vehicle, the method comprising the acts of:
providing a spring strut cup composed of a metallic material, and three shell components composed of a fiber composite material;
fastening a first shell component to an outer side of an engine bracket and to a lower side of a support bracket such that the first shell component spans an arc,
fastening an edge of the spring strut cup from below to the first shell component,
fastening a second shell component to an upper side of a support bracket, an upper side of the first shell component and an outer upper side of the spring strut cup, and
fastening a third shell component to an inner side of an engine bracket and an upper side of the engine bracket and to an inner side of the first shell component and an inner upper side of the spring strut cup.

13. The method according to claim 12, wherein:
the third shell component, together with the first shell component, form a substantially vertical profile, and
the substantially vertical profile is closed at a lower end thereof by the engine bracket and at an upper end thereof by the spring strut cup.

14. The method according to claim 13, wherein the fastening acts are carried out such that:
the spring strut cup is joined to the first shell component, which is joined from below to a lower side of the support bracket,
the second shell component is joined from above to an upper side of the support bracket and to the spring strut cup, wherein
a substantially rectangular profile is formed between an outer side of the spring strut cup, an inner side of the support bracket, the first shell component which is joined from below to the support bracket, and the second shell component which is joined to the upper side of the support bracket.

15. The method according to claim 14, wherein:
the third shell component, together with the first shell component, form a substantially vertical profile, and
the substantially vertical profile is closed at a lower end thereof by the engine bracket and at an upper end thereof by the spring strut cup.

16. The method according to claim 12, wherein the spring strut cup and the three shell components are adhesively bonded to one another.

17. The method according to claim 16, wherein:
the third shell component, together with the first shell component, form a substantially vertical profile, and
the substantially vertical profile is closed at a lower end thereof by the engine bracket and at an upper end thereof by the spring strut cup.

18. The method according to claim 16, wherein the fastening acts are carried out such that:
the spring strut cup is joined to the shell component, which is joined from below to a lower side of the support bracket,
the second shell component is hoibed from above to an upper side of the support bracket and to the spring strut cup, wherein
a substantially rectangular profile is formed between an outer side of the spring strut cup, an inner side of the support bracket, the first shell component which is joined from below to the support bracket, and the second shell component which is joined to the upper side of the support bracket.

19. The method according to claim 18, wherein
the third shell component, together with the first shell component, form a substantially vertical profile, and
the substantially vertical profile is closed at a lower end thereof by the engine bracket and at an upper end thereof by the spring strut cup.

\* \* \* \* \*